Dec. 23, 1941.  J. SCHMIDT  2,267,174
GREEN CORN CUTTING APPARATUS
Filed Sept. 9, 1940  2 Sheets-Sheet 1
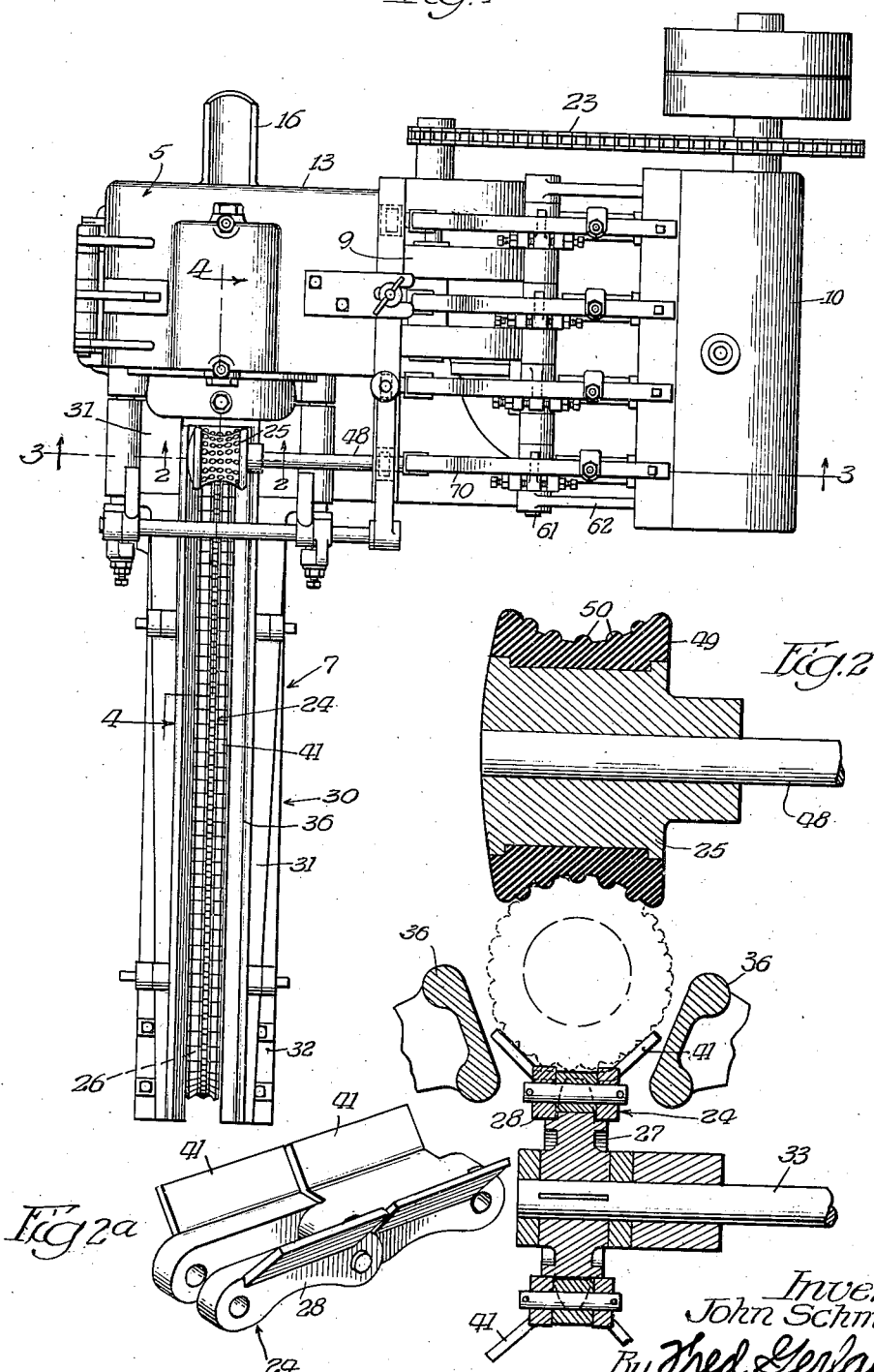
Inventor
John Schmidt
By Thed Gerlach
Atty.

Patented Dec. 23, 1941

2,267,174

UNITED STATES PATENT OFFICE 2,267,174

GREEN CORN CUTTING APPARATUS

John Schmidt, Philadelphia, Pa.

Application September 9, 1940, Serial No. 355,931

2 Claims. (Cl. 130—9)

The present invention relates generally to apparatus for cutting the kernels from the cobs of green corn. More particularly the invention relates to that type of green corn cutting apparatus which is used in connection with commercial corn packing or canning and as its main or principal parts comprises: (1) a supporting structure in the form of a horizontally elongated housing having at the front end thereof an inlet for the corn to be cut and embodying in the bottom portion a discharge duct for the cut kernels and at the rear end an outlet for the cobs, (2) a rotary power driven cutting head which is mounted in the housing and has in the central portion thereof and in axial alignment with the corn inlet an opening for the passage therethrough of the ears of corn to be cut and in addition has within the opening an annular series or set of substantially radially movable knives for cutting the kernels from the cobs as the corn is successively fed through the central opening, and (3) power driven means for feeding the ears of corn successively and longitudinally through the central opening in the rotary cutting head for cutting of the kernels by the knives.

In a corn cutting apparatus of this type it has heretofore been customary to employ as the means or medium for feeding the ears successively through the central opening in the rotary cutting head, an endless horizontally extending conveyor in front of the housing and with the upper reach thereof in alignment with the bottom portion of the corn inlet and in addition a pair of opposed oppositely disposed and driven separable feed rolls between the discharge end of the conveyor and the rotary cutting head. In practice it has been found that a corn cutting apparatus having feed means of this character is objectionable or defective for the reason that certain kinds or types of ears do not pass directly from the discharge end of the endless conveyor to and between the feed rolls and so jam between the conveyor and the rolls that it is necessary to discontinue operation of the apparatus until removal of the jammed ear or ears.

One object of the present invention is to provide a corn cutting apparatus which is an improvement upon previously designed apparatus of the same general character and for the same purpose by reason of the fact that it includes a novel form or arrangement of feed means which effectively and efficiently eliminates the possibility of jamming of the ears during feed thereof to and through the rotary cutting head. The present apparatus is characterized by the fact that the means for feeding the ears of corn successively and longitudinally through the central opening in the cutting head comprises instead of an endless conveyor and two main oppositely disposed feed rolls between the discharge end of the conveyor and the cutting head, an endless conveyor and a single feed roll directly over and coacting with the discharge end of the conveyor. By having but a single main feed roll and the latter disposed over the discharge end of the conveyor a positive feeding of the ears of corn takes place and it is substantially impossible for any of the ears of corn to become jammed while in transit to the central opening in the cutting head. Furthermore, the feed means as a whole is simplified and involves but a small or minimum number of parts.

Another object of the invention is to provide a corn cutting apparatus of the last mentioned character in which the endless conveyor part of the feed means is of the chain and sprocket variety and the single main feed roll and the sprocket at the discharge end of the conveyor are connected together so as to move conjointly and equidistantly to and from one another in connection with passage of ears of different sizes therebetween.

A further object of the invention is to provide a green corn cutting apparatus of the type and character under consideration in which the links of the chain of the endless conveyor have outwardly divergent side wings which when in the upper reach of the conveyor form a substantially V-shaped trough whereby the ears of corn travelling thereon are caused to be brought into proper longitudinal alignment with the axis of the rotary cutting head.

A still further object of the invention is to provide a green corn cutting apparatus which is generally of new and improved construction and has certain advantages over that which is shown in, and forms the subject matter of, United States Letters Patent No. 2,214,285, granted to me September 10, 1940.

Other objects of the invention and the various advantages and characteristics of the present corn cutting apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a plan view of a green corn cutting apparatus embodying the invention;

Figure 2 is an enlarged vertical transverse section taken on the line 2—2 of Figure 1 and illustrating the design and construction of the single main feed roll and the sprocket at the discharge end of the endless conveyor;

Figure 3:
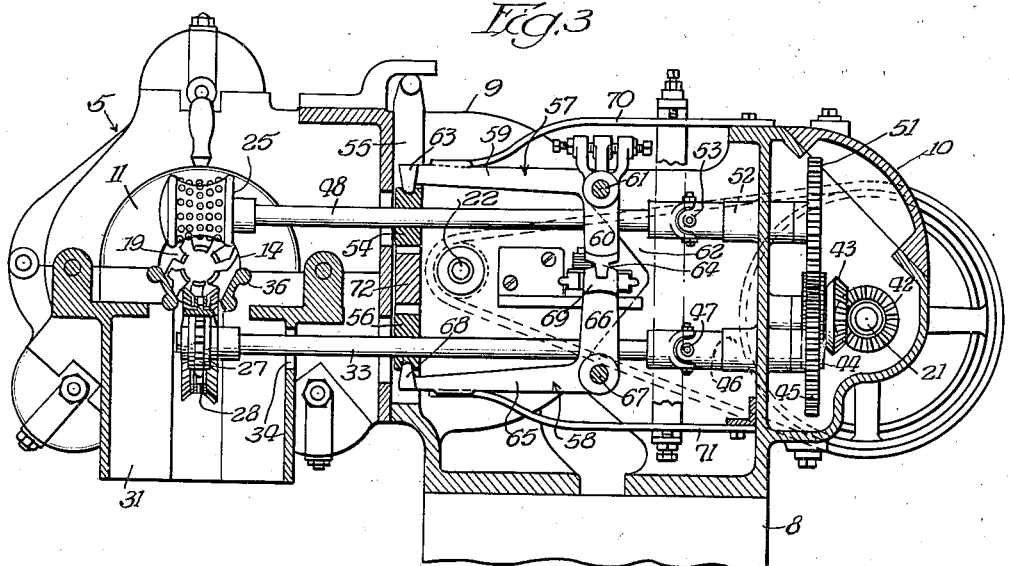
Figure 4:
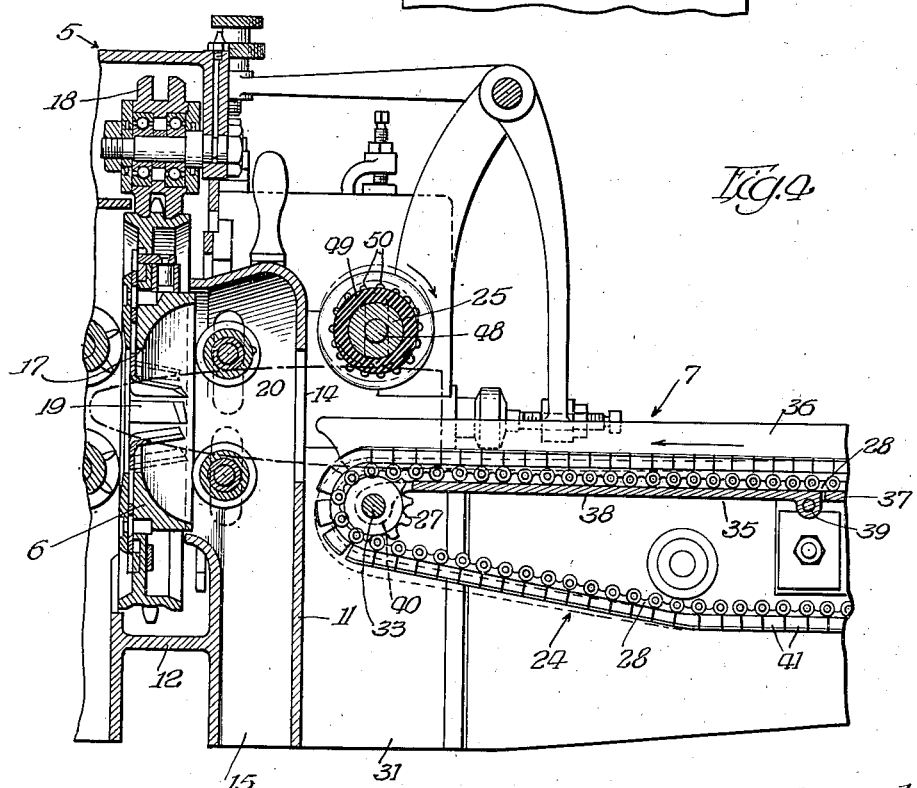

Figure 2ª is a perspective view of a portion of the chain of the conveyor;

Figure 3 is an enlarged vertical transverse section taken on the line 3—3 of Figure 1 and showing in detail the construction and design of the means for conjointly driving the single main feed roll and the sprocket at the discharge end of the endless conveyor and also showing the design and arrangement of the means whereby the feed roll and sprocket are connected together for conjoint and equidistant movement to and from one another; and Figure 4 is an enlarged fragmentary vertical longitudinal section taken on the line 4—4 of Figure 1 and disclosing the manner in which the single feed roll and the discharge end of the endless conveyor coact to feed the ears of corn to be cut successively and longitudinally through the central opening in the rotary cutting head.

The apparatus which is shown in the drawings constitutes the preferred embodiment of the invention. It is primarily designed and adapted to cut the kernels from the cobs of green corn in connection with packing or canning on a commercial scale and as its main or principal parts comprises an elongated housing 5, a rotary cutting head 6, and means 7 for feeding the ears of corn to be cut successively and longitudinally to and through the cutting head. The apparatus, with the exception of the feed means 7, is like that of my aforesaid Patent No. 2,214,285 and reference may be had to the latter for a more detailed disclosure of the various operating parts of the apparatus.

The housing 5 serves as a supporting structure for the rotary cutting head 6 and is carried in an elevated and horizontal position by way of a frame 8. It is associated with a pair of casings 9 and 10 and embodies a front end wall 11, a bottom wall 12 and a rear end wall 13 together with top and side walls. The front end wall 11 extends vertically and has a circular inlet 14 for the ears of corn to be cut. The bottom wall 12 of the housing extends between and serves to space apart the front and rear end walls and is shaped to form directly behind and beneath the inlet 14 a downwardly extending duct 15 for the cut kernels. The rear end wall 13 is parallel to the front end wall 11 and has an outlet 16 for the cobs. Said outlet is axially aligned with the corn inlet 14 in the front end wall 11. The rotary cutting head 6 is disposed in the housing 5 directly behind the front end wall 11, as shown in Figure 4. It embodies a central circular opening 17 and is supported for rotation about a horizontal axis by way of a set of rollers 18. The latter carry the head so that the latter extends transversely of the housing and the circular opening 17 is coaxial with the corn inlet 14. An annular set or series of bevel edged knives 19 is carried by the head 6 within the central opening 17 and the knives of this set are radially movable and are adapted, in connection with rotation or drive of the head and feed of an ear of corn through the opening, to cut the kernels of corn from the cob. A pair of small diameter power driven oppositely disposed feed rolls 20 is disposed directly in front of the head and serve as a medium for opening the knives to a cutting position in connection with feed of an ear of corn into the central opening 17. The knives 19 are mounted and controlled as set forth in said Patent No. 2,214,285. The kernels which are cut by the knives are discharged from the housing via the discharge duct 15 in the bottom wall 12. The cutting head 6 is driven by means of a power shaft 21, a countershaft 22 and gearing (not shown) in the casing 9 and the housing 5. The casing 9 is located at one side of and is fixed to the housing 5 as shown in Figure 1, and the casing 10 is located outwardly of the casing 9. The power shaft 21 extends through and is journalled in the casing 10 and is in parallel relation with the line of travel of the ears of corn. It is connected to and operates to drive the countershaft 22 by way of a sprocket and endless chain connection 23. The countershaft extends through and is journalled in suitable bearings in the casing 9 and is parallel to the power shaft 21. When the power shaft 21 is in operation the cutting head 6 is driven at a comparatively high speed and, as hereinafter described, the feed means 7 operates to feed the ears of corn to be cut successively through the central opening 17 in the head 6. As the ears of corn pass successively through such opening the knives 19 cut the kernels from the cobs and the cut kernels are discharged from the housing by way of the discharge duct 15. After cutting of the kernels the cobs pass from the housing via the outlet 16 in the rear end wall 13 of the housing.

The improved means for feeding the ears of corn successively through the central opening 17 in the cutting head comprises an endless conveyor 24 and a single main feed roll 25. The endless conveyor 24 is positioned directly in front of the front end wall 11 of the housing 5 and consists of a pair of sprockets 26 and 27 and a chain 28. It fits between an elongated horizontally extending frame 29 and is so constructed and arranged that it embodies an upper reach which is longitudinally aligned with the inlet 14 in the front end wall 11 of the housing and the central opening 17 in the rotary cutting head 6. The frame 29 consists of a pair of laterally spaced frame members 30 and these are positioned in parallel relation and are fixedly or rigidly attached to a bracket 31. The sprocket 26 is at the receiving end of the conveyor 24 and is mounted on a horizontally extending stub shaft (not shown) which is carried by and journalled in bearing blocks 32 at the front ends of the frame members 30. The sprocket 27 is at the discharge end of the endless conveyor 24 and is fixed to an elongated shaft 33. It is disposed directly in front of the front wall 11 of the housing 5 and is positioned between the rear ends of the frame members 30 of the frame 29. The shaft 33 extends substantially horizontally and projects in the direction of the casing 10, as shown in Figure 1. It is driven as hereinafter described, by the power shaft 21 and extends through a vertically elongated slot 34 in one of the frame members 30. The chain 28 of the conveyor 24 is endless. It is disposed between the frame members 30 of the frame 29 and is trained around the sprockets 26 and 27. The upper reach of the chain is supported by an elongated strip 35 and has a pair of elongated laterally spaced trough forming members 36 at its sides. The strip 35 extends between the two sprockets 26 and 27 and consists of a fixed forward section 37 and a pivoted rear section 38. The front section extends between and is carried by the frame members 30 of the frame 29. The rear section 38 of the strip 35 is pivotally supported at its front end by way of a horizontal pivot pin 39 which extends between and is carried by the members 30. The rear or distal end of the rear section 38 is provided with a pair of laterally spaced apertured lugs 40 and these lap the sprocket 27 and fit around the adjacent end of the shaft 33 so that the rear section 38 is vertically movable with the sprocket 27. The trough forming members 36 are secured to the upper portions of the frame members 30 and are disposed at the sides of the upper reach of the endless conveyor. They extend from the front ends of the members 30 to the front wall 11 of the housing 5 and prevent lateral displacement of any ears of corn on the upper reach of the conveyor 24. The chain 28 of the conveyor consists of single links and alternately arranged double links. The single links are pivotally connected to the ends of the double links and both types of links have upwardly and outwardly extending side wings 41. Such wings are arranged in what may be termed a V formation and are so positioned or disposed that they operate when travelling in the upper reach of the conveyor to maintain the ears of corn in true longitudinal alignment with the central opening 17 in the cutting head 6. Because of the arrangement and action of the wings it is impossible for any ear of corn on the conveyor to travel other than in truly parallel relation with the path of travel. In other words the wings prevent the ears of corn on the conveyor from assuming an angled or tilted position with respect to the line or course of travel. The sprocket 27 is adapted to be driven so that the ears of corn which are placed on the upper reach of the conveyor after husking are caused to be fed one at a time towards the cutting head 6. The means for driving the sprocket wheel 27 comprises a pair of bevel gears 42 and 43, an idler gear 44, a gear 45 and a stub shaft 46. The bevel gear 42 is mounted on and keyed or otherwise fixedly secured to the power shaft 21 (see Figure 3). It is disposed in the casing 10 and is in mesh with and serves to drive the bevel gear 43. The latter is mounted on a stub shaft (not shown) and this is journalled in a bearing in the casing 10 and carries the idler gear 44. The gear 45 is in mesh with and is driven by the idler gear and is fixed to one end of the stub shaft 46. Said stub shaft extends transversely through and is journalled in a bearing in the casing 10. It is connected by a universal joint 47 to the end of the shaft 33 that is remote from, or opposite to, the sprocket 27. The joint 47 permits the shaft 33 together with the sprocket 27 and the discharge end of the endless conveyor 24 to swing or move relatively to the stub shaft 46. The slot 34 restricts the shaft 33 and the parts associated therewith to vertical swinging movement.

The feed roll 25 is located directly above the sprocket 27 at the discharge end of the endless conveyor 24. It coacts with said discharge end of the conveyor to feed the ears of corn successively to and through the cutting head 6. As shown in Figure 2, the roll 25 is mounted on one end of a substantially horizontal shaft 48. It has a tubular outer tread part 49. The latter is preferably formed of vulcanized rubber and has a concave outer periphery. Hemispherical knob-like protuberances 50 are formed on the outer periphery of the tread part 49 and serve to grip the ears of corn without puncturing or otherwise mutilating the kernels. Preferably the protuberances 50 are formed as integral parts of the tread part 49. The shaft 48 overlies and is substantially the same in length as the shaft 33 for the sprocket 27. It is disposed exteriorly of the housing 5 and is connected for drive from the gear 45 by way of a gear 51 and a stub shaft 52. The gear 51 is disposed in the casing 10 and is in mesh with the gear 45. The stub shaft 52 overlies the stub shaft 46 and is journalled in a bearing in said casing 10. The gear 51 is keyed or otherwise fixedly secured to the inner end of the stub shaft 52. A universal joint 53 extends between and serves to connect the outer end of the stub shaft 52 and the end of the shaft 48 that is remote from or opposite to the feed roll 25. Said joint permits the shaft 48 together with the feed roll to swing vertically. When the power shaft 21 is in operation the gears 45 and 51 are driven and operate through the medium of the stub shafts 46 and 52 and the shafts 33 and 48, to drive the sprocket 27 and the feed roll 25. Because the gear 51 is driven from the gear 45 the sprocket 27 and the feed roll 25 are reversely driven (see arrows in Figure 4). The sprocket wheel and the feed roll are of such size that the chain 28 of the conveyor 24 is driven at the same speed as the peripheral speed of the feed roll. When the apparatus is in operation and an ear of corn is placed on the upper reach of the conveyor 24 such ear is fed in the direction of the housing 5. When the ear approaches the discharge end of the conveyor it passes between such discharge end and the feed roll 25 and the two coact to feed the ear into and through the central opening 17 in the rotary cutting head 6. The shaft 48 together with the feed roll 25 is restricted to vertical swinging movement by way of a shoe 54. The latter is mounted on the central portion of the shaft 48 and is vertically slidable in a vertical guideway 55 between the housing 5 and the casing 9. The shaft 33 is provided with a shoe 56 on its central portion and this shoe is disposed beneath the shoe 54, as shown in Figure 3, and is confined to vertical sliding movement in the guideway 55.

The feed roll 25 and the sprocket 27 are connected together for conjoint and equidistant vertical movement to and from one another by means of a pair of bell cranks 57 and 58. These cranks are associated with the shafts 48 and 33 respectively and are positioned in front of the casing 9. The bell crank 57 is disposed directly above the bell crank 58. It comprises a horizontally extending arm 59 and a depending vertically extending arm 60 and it is mounted for vertical pivotal movement on a stud 61 which is carried by a bracket 62 on the casing 10. The arms 59 and 60 of the bell crank 57 extend at right angles to one another and are conjointly movable. The distal end of the arm 59 embodies a depending finger 63 and this fits within a recess in the shoe 54. The lower distal end of the arm 60 embodies a single depending tooth 64. The bell crank 58 is in the form of a one-piece casting and comprises a horizontally extending arm 65 and an upstanding vertically extending arm 66. It is mounted for vertical pivotal movement on a stud 67 which is carried by the bracket 62 on the casing 10. The distal end of the arm 65 of the bell crank 58 embodies an upstanding finger 68 which fits within a recess in the lower end of the shoe 56. The upper or distal end of the arm 66 embodies a pair of teeth 69 and these straddle the tooth 64 and so connect the two crank arms that they move in unison and thus cause the feed roll and the sprocket to move to and from one another simultaneously and equidistantly. The feed roll 25 and the sprocket 27 are urged together into a closed position by way of a pair of leaf springs 70 and 71. These springs are positioned one over the other, as shown in Figure 3, and project from the casing 10 in the direction of the housing 5. The spring 70 overlies the shaft 48 and bears against the horizontally extending arm 59 of the bell crank 57. The spring 71 underlies the shaft 33 and bears against the horizontally extending arm 65 of the bell crank 58. A block 72 in the guideway 55 and between the shoes 54 and 56 prevents full closing of the feed roll and sprocket. The feed roll 25 and the sprocket 27 are so positioned and are adapted so to coact with one another that they maintain the ears of corn passing between them in truly centered relation with the opening 17 in the rotary cutting head 6.

When it is desired to operate the apparatus the power shaft 21 is first set into motion. As soon as the shaft 21 starts to rotate the endless conveyor 24 and the feed roll 25 commence to rotate and the cutting head 6 is set in motion. As soon as the apparatus reaches its full or normal speed the ears of corn to be cut, after husking, are placed on the upper reach of the endless conveyor 24. Preferably the ears are so arranged that the small ends face in the direction of the cutting head 6. As soon as an ear is placed on the upper reach of the conveyor 24 it moves towards the front end wall 11 of the housing 5. When the ear reaches the discharge end of the conveyor it comes in contact with the feed roll 25 and is fed by the latter and the discharge end of the conveyor to and through the cutting head 6. If the ear is a large one the feed roll 25 and the sprocket 27 move apart, as shown in dotted lines in Figure 4. Due to the action of the coacting bell cranks 57 and 58 the feed roll and sprocket move simultaneously and equidistantly away from one another. As the ear is fed through the hole 17 in the cutting head 6 the knives 19 cut the kernels from the cob, as hereinbefore pointed out. By reason of the fact that the links 28 of the endless conveyor 24 embody the side wings 41 the ears of corn to be cut are automatically longitudinally aligned with the central opening 17 in the cutting head during travel on the upper reach of the conveyor 24.

The herein described corn cutting apparatus is exceptionally efficient in operation by reason of the fact that the feed means 7 thereof is so designed that jamming of the ears of corn during travel to and through the head 6 is effectively eliminated. Because the feed means 7 embodies but a single main feed roll it effectively and efficiently fulfills its intended purpose and is essentially of simplified design or construction.

Whereas the apparatus has been described as comprising a rotary cutting head, the knives of which are moved outwards into a cutting position in response to outward movement of the auxiliary feed rolls 20 due to the passage of an ear of corn therebetween, it is to be understood that an apparatus embodying the improved feed means 7 in combination with a different form or type of cutting head is within the purview of the invention. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A green corn cutting apparatus comprising a supporting structure, a cutting head mounted on the structure to rotate about a substantially horizontal axis and having a central opening for the passage therethrough of the ears of corn to be cut and a kernel cutting knife adjacent the opening, and means for feeding said ears successively and longitudinally through the opening for cutting of the kernels by the knife embodying a horizontally extending conveyor disposed in front of the head and consisting of a sprocket at the receiving end, a sprocket at the discharge end and in close proximity to said head and an endless link-type chain trained around the sprockets, carried and supported by the latter so that the upper reach thereof is in alignment with the bottom portion of the opening in the head, and having the links thereof provided with outwardly extending angularly disposed side wings arranged in V formation and serving when travelling in the upper reach of the conveyor automatically to maintain the ears of corn in parallel relation with the axis of said cutting head, a feed roll positioned directly over the second mentioned sprocket and adapted when it and the conveyor are driven, to coact with the discharge end of the conveyor to feed the ears toward and in centered relation with said opening, and power means for conjointly and reversely driving the feed roll and said second mentioned sprocket for corn feeding purposes, said feed roll and second mentioned sprocket being mounted to move to and away from each other and having means associated therewith whereby they are caused to move conjointly and equidistantly to and from one another and in addition having spring means associated therewith for urging them toward one another.

2. A green corn cutting apparatus comprising a supporting structure, a power driven cutting head mounted on the structure to rotate about a substantially horizontal axis and having a central opening for the passage therethrough of the ears of corn to be cut and a kernel cutting knife adjacent the opening, and means for feeding said ears successively and longitudinally through the opening for cutting of the kernels by the knife including a horizontally extending power driven conveyor of the endless chain and sprocket type disposed in front of the head and having an upper corn conveying reach in alignment with the bottom portion of the opening, the links of the chain of the conveyor having outwardly extending angularly disposed side wings arranged in V formation and serving when travelling in the upper reach of the conveyor automatically to maintain the ears of corn in parallel relation with the axis of said cutting head.

JOHN SCHMIDT.